US010455385B2

(12) United States Patent
Babbage et al.

(10) Patent No.: US 10,455,385 B2
(45) Date of Patent: Oct. 22, 2019

(54) PROVISIONING A NETWORK SUBSCRIPTION

(71) Applicant: VODAFONE IP LICENSING LIMITED, Newbury, Berkshire (GB)

(72) Inventors: Stephen Babbage, London (GB); Nicholas Bone, London (GB); Christopher Pudney, London (GB); Aguibou Mountaga Barry, London (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 0 days.

(21) Appl. No.: 15/304,404

(22) PCT Filed: Apr. 14, 2015

(86) PCT No.: PCT/GB2015/051136
§ 371 (c)(1),
(2) Date: Oct. 14, 2016

(87) PCT Pub. No.: WO2015/159072
PCT Pub. Date: Oct. 22, 2015

(65) Prior Publication Data
US 2017/0041733 A1 Feb. 9, 2017

(30) Foreign Application Priority Data

Apr. 15, 2014 (GB) .................................. 1406783.9

(51) Int. Cl.
*H04W 4/50* (2018.01)
*H04W 8/20* (2009.01)
(Continued)

(52) U.S. Cl.
CPC ............ *H04W 4/50* (2018.02); *G06F 21/313* (2013.01); *G06F 21/41* (2013.01); *H04W 4/70* (2018.02);
(Continued)

(58) Field of Classification Search
CPC ..... H04W 4/001; H04W 4/005; H04W 12/06; H04W 8/205; H04W 12/08; G06F 21/313; G06F 21/41; G06F 2221/2117
(Continued)

(56) References Cited

U.S. PATENT DOCUMENTS 5,854,982 A * 12/1998 Chambers ............... H04W 8/12
455/445
7,266,371 B1 9/2007 Amin et al.
(Continued)

FOREIGN PATENT DOCUMENTS

| WO | 2011057668 A1 | 5/2011 |
| WO | 2013039900 A1 | 3/2013 |
| WO | 2014020237 A1 | 2/2014 |

OTHER PUBLICATIONS

Search Report issued in GB 1406783.9 dated Aug. 6, 2014.
(Continued)

*Primary Examiner* — Shahriar Behnamian
(74) *Attorney, Agent, or Firm* — Workman Nydegger

(57) ABSTRACT

Provisioning a subscriber in a network is provided by: receiving an initialisation request for access to a network on behalf of a subscriber, at an admission platform of a network operator associated with the subscriber, and assigning the subscriber limited access rights to the network, the limited access rights being configured for communication between the subscriber and a subscription manager, for reconfiguration of identity information associated with the subscriber.

12 Claims, 2 Drawing Sheets

(51) Int. Cl.
*H04W 12/08* (2009.01)
*H04W 12/06* (2009.01)
*G06F 21/31* (2013.01)
*G06F 21/41* (2013.01)
*H04W 4/70* (2018.01)
*H04W 12/00* (2009.01)

(52) U.S. Cl.
CPC ........... *H04W 8/205* (2013.01); *H04W 12/06* (2013.01); *H04W 12/08* (2013.01); *G06F 2221/2117* (2013.01); *H04W 12/00518* (2019.01)

(58) Field of Classification Search
USPC ........................................................ 455/419
See application file for complete search history.

(56) References Cited

U.S. PATENT DOCUMENTS

2011/0124313 A1   5/2011   Jones
2012/0077496 A1*  3/2012   Mathias ................. G06Q 30/06
                                                  455/435.1
2014/0335791 A1* 11/2014   Kim ...................... H04W 4/008
                                                  455/41.2
2016/0174065 A1*  6/2016   Li ......................... H04W 8/205
                                                  455/419

OTHER PUBLICATIONS

International Search Report and Written Opinion issued in PCT/GB2015/051136 dated Sep. 29, 2015.

"3rd Generation Partnership Project; Technical Specification Group Services and System Aspects; Feasibility Study on the Security Aspects of Remote Provisioning and Change of Subscription for Machine to Machine (M2M) Equipment (Release 9)" 3GPP Standard, vol. V9.2.0, Jun. 22, 2010, pp. 1-87.

GSMA: "Official Document 12FAST.13—Embedded SIM Remote Provisioning Architecture Version 1.1" Dec. 17, 2013.

* cited by examiner

PROVISIONING A NETWORK SUBSCRIPTION

FIELD OF THE INVENTION

The present invention relates to a method for provisioning a subscriber in a network and in particular a cellular network. An admission platform which may form part of a cellular network entity is also provided.

BACKGROUND OF THE INVENTION

In computer or radio networks, such as cellular networks, techniques for configuring and provisioning new subscribers are well known. For example, a Universal Integrated Circuit Card (UICC), such as a SIM card for a cellular network, is provided for each subscriber and these are typically personalized individually with unique keys and identifiers at a secure personalisation centre (which may be operated by a SIM vendor).

The SIM cards are then distributed from that centre either to operator warehouses, or directly to a modem or whole device manufacturer (OEM) for integration as a component part. The latter option is increasingly the case for devices configured for Machine to Machine (M2M) or Machine Type Communication (MTC) operation. The OEM then personalizes the rest of the device, for example with a flash image, unique device ID, MAC address and possibly other keys.

This approach has several problems: each unique personalization step adds costs; there is a "detour" from the original chip maker via the (SIM) personalization centre before the UICC is shipped to the OEM; the UICC is constrained in terms of form factor (for instance, it may be required to be a dedicated "chip" with its own packaging, defined contacts and size). This latter point can create some issues in terms of size of M2M equipment and durability of the UICC in a long-lived device or in a difficult environment (the card may be shaken loose, contacts may overheat, freeze, become too moist or similar). While specially packaged UICCs exist (machine form factor), these are more expensive than conventional UICC or SIM card form factors, and so are difficult to apply to low cost devices.

Assuming that the overall device cost is reduced significantly, which may be true for low cost M2M devices, the UICC or SIM card may become a disproportionate share of the total device cost.

Recent approaches towards an embedded SIM (eUICC) have resulted in standardization efforts in the GSM Association (GSMA) and the European Telecommunications Standards Institute (ETSI). These may allow an operator subscription to be updated remotely on the UICC. However, such approaches still require unique initial secrets to be loaded to each UICC and, as a result, do not avoid the need for a smart card personalization centre. Moreover, the UICC needs to be loaded with an initial International Mobile Subscriber Identity (IMSI), subscriber key (Ki) and profile (a so-called "provisioning subscription") in order to connect to a mobile network and download a permanent subscription. These provisioning subscription credentials must themselves be created and provisioned securely, to prevent fraud or other abuse of the provisioning subscription. Again, cost is an issue. The eUICC solution is more expensive than a conventional SIM card.

A further solution has been proposed, which would allow the SIM card to be placed inside another chip package (the baseband processor). However, this solution may not necessarily meet operator security requirements, as the operator credentials would need to be provisioned to the SIM card at an insecure location (OEM production line).

Further developments within the Third Generation Partnership Project (3GPP) standardisation body consider an alternative network architecture, in which a special, preliminary IMSI (PIMSI) is assigned to a new subscriber prior to initial access to the network and provisioning. The PIMSI is installed by the equipment supplier and is not associated with any specific home network operator. This is discussed in 3GPP Technical Report (TR) 33.812 v.0.2.1, for example. As with other solutions, this requires the initial subscription to be secure and the PIMSI must be allocated with a specific cryptographic key to allow this. Moreover, the access network needs to be aware of the PIMSI status, so that provisioning can take place. This adds complexity to the network architecture and functionality, especially in parts of the network that are outside the control of the network operator.

Therefore, there is required an approach for provisioning a new subscriber that overcomes these problems.

SUMMARY OF THE INVENTION

Against this background and in accordance with a first aspect there is provided a method for provisioning a subscriber in a network, comprising the steps of: receiving an initialisation request for access to a network on behalf of a subscriber linked to a subscription unit, at an admission platform of a network operator associated with the subscriber, the initialisation request indicating a subscriber identity; and assigning the subscriber limited access rights to the network, the limited access rights being configured for communication (especially on the user-plane) between the subscriber and a subscription manager, for reconfiguration of identity information associated with the subscriber.

This approach allows the subscriber (usually a new subscriber, although it may be an existing subscriber that is simply desirous of re-provisioning) to access the network despite possibly only having a temporary identity (in other words, a temporary subscription), but only with sufficient access rights to communicate with a subscription manager. The admission platform (which is typically logically separate from the subscription manager and generally also physically separate therefrom, but can be integrated) may otherwise act as a regular network element, except with the additional functionality to restrict a special subscriber, such as a new subscriber, accordingly. This allows the subscription manager to reconfigure the subscriber identity and allow the subscriber additional access to the network thereby. This approach is especially applicable to a cellular network (or networks). More preferably, it may be used for a Machine Type Communication (MTC or M2M) subscriber. The subscriber identity may be previously assigned to the special subscriber or the subscription unit or a device associated with the subscription unit may determine the subscriber identity.

The subscription unit may be a UICC, SIM card, SIM application, subscription application, device with an integrated subscription or subscription application (software, for example) or similar. In embodiments, the subscription unit may be able to store (or may store) the information relating to more than one subscriber.

Since provisioning of the subscriber (for example, by reconfiguration of the subscriber identity information) takes place once the subscriber is given a restricted form of network access (allowing user-plane communication only with the subscription manager), the security issues relating to the subscription can be dealt with on the user plane directly between the subscriber and the subscription manager. It is not necessary for the subscriber to be set up with an initial subscription that requires a significant amount of configuration, a high level of security or (more typically) both. Where a UICC or SIM card is used, this may result in significant benefits in the manufacturing and production process (for example, avoiding the need for complex arrangements between the UICC manufacturer, OEM and network operator and mitigating the problem of trust to ensure network operator security), but without putting significant strain on the network as a result, especially in the form of significant increase in complexity for the network infrastructure or admission platform.

The reconfigured identity information associated with the subscriber may comprise the subscriber identity. Provisioning of the subscriber may additionally or alternatively comprise configuration or reconfiguration of one or more access credentials, such as a cryptographic key associated with the subscriber.

In some embodiments, the method further comprises identifying the subscriber as special, on the basis of the indicated subscriber identity. A special status may indicate that the subscriber is new or desires re-provisioning. Optionally, the step of assigning the subscriber limited access rights to the network may be in response to the identification.

Optionally, the subscriber identity indicates the network operator associated with the subscriber. In some cases, the admission platform is configured for receiving initialisation requests indicating the network operator associated with the subscriber. For example, all initialisation requests indicating the network operator associated with the subscriber may be routed to the admission platform, irrespective of the remainder of the subscriber identity. Additionally or alternatively, the method may further comprise: routing the initialisation request to the admission platform on the basis of the subscriber identity. For example, a part of the subscriber identity may comprise a predetermined code, identifying the subscriber as a special (such as new) subscriber. This will be discussed in more detail below.

In embodiments, the step of routing may be based on the indicated network operator. In a cellular network, the indication of the network operator may comprise one or both of: a Mobile Country Code (MCC); and a Mobile Network Code (MNC), for example as part of an International Mobile Subscriber Identity (IMSI). In particular, the step of routing may be carried out (at least in part) by a Visited Public Land Mobile Network (PLMN), more preferably by a Mobility Management Entity (MME). Additionally or alternatively, the step of routing may be carried out (at least in part) by a routing agent, such as a Signalling System 7 (SS7) or Diameter routing agent for a cellular network. This functionality is not necessarily different from existing functionality of these network elements. Indeed, the preferred embodiment involves no changes at all to parts of the network that are part of or correspond with a Visited PLMN. However, the combination of such existing functionality with the new functionality of the admission platform may be especially advantageous.

Preferably, the method further comprises provisioning the subscriber, by communication of instructions to reconfigure the subscriber identity from the subscription manager to the subscriber. This may be preceded by a step of configuring bi-direction user plane communication between the subscriber and the subscription manager for reconfiguration of the subscriber identity, although the step of provisioning the subscriber may be optional. The admission platform may perform at least part of this configuring step in some embodiments.

As noted above, the method may be particularly applicable to a radio access network such as a cellular network, which may include: GSM; UMTS; and LTE. The method may also be applicable to WiFi, WiMax or similar radio access networks. In the case of a cellular network, the initialisation request may relate to access to a Visited PLMN. In the preferred embodiment, the admission platform is a part of the Home PLMN of the subscriber (for example, as indicated by the MCC and MNC in the temporary IMSI).

The initialisation request can take a number of different forms. For example, a Network Attach Request may be communicated from the subscriber to the Visited PLMN. Additionally or alternatively, an interchange may take place between the visited PLMN and admission platform in the Home PLMN. This may be used to set up the ability (that is, connectivity) for the subscriber's device to communicate with the subscription manager. In some cases, there may be reconfiguration request from the subscriber to the subscription manager (subsequently).

The admission platform preferably comprises or is part of a Home Subscriber Server, HSS, or Home Location Register, HLR, of the Home PLMN. The admission platform may comprise more than one network entity in embodiments. The admission platform may be one of a plurality of HLR/HSS entities in a Home PLMN for example. Messages in connection with subscribers that are identified as special (due to the indication provided in their subscriber identity or IMSI) may be routed to this particular HLR/HSS. In embodiments, the routing functionality in the Home PLMN to allow messages to reach this particular HLR/HSS may also be considered as part of a composite admission platform.

The subscription manager is preferably logically separate from the admission platform. It may also be physically separate, although this is not necessarily always true, even with logical separation. For example, the subscription manager may be operated by someone other than the Home PLMN operator. In that case, it may be located outside the Home PLMN and it could be shared between more than one PLMN. For instance, the subscription manager may be an IT server.

As noted above, the subscriber identity may be an IMSI. The IMSI may comprise a Mobile Subscriber Identification Number (MSIN). In embodiments, the MSIN comprises a predetermined code indicating that the IMSI is a temporary (or special) subscriber identity. This may be used in the step of routing the initialisation request to the admission platform on the basis of the subscriber identity. Additionally or alternatively, this may be used in the step of identifying the subscriber as new, on the basis of the indicated subscriber identity. The subscriber identity (especially the MSIN part of an IMSI) may be set on the basis of a hardware serial number, such as an International Mobile Station Equipment Identity (IMEI) or a Media Access Control (MAC) address (or a combination of the two) for a device associated with the subscriber or subscription unit. The subscriber identity may be partly random (based on a random sequence), partly or fully predefined (that is based on a predefined sequence) and it may be chosen by the subscription unit or a device associated therewith. This may have a number of advantages, for example mitigating the possibility that two subscribers will contact the admission platform with the same temporary IMSI, especially at the same time. The MSIN may be based on or include part or all of the IMEI, for instance. The subscriber identity may not necessarily be unique to the subscriber and a predetermined fixed subscriber identity may be used.

In another aspect, the subscriber (which is typically associated with a subscription unit) may be configured with an initial configuration comprising: a subscriber identity, as discussed herein; and a subscriber key (such as a Ki), with a low level of security. For example, the subscriber key may be based on one or more of: the IMSI; the IMEI; the MAC address; a fixed key. The combination may be a cryptographic hash. This may be implemented on a subscriber's UICC or SIM card. Such a low level of security is permitted. This may be because the initial access is significantly restricted (only to communication with the subscription manager) and subsequent (less restricted) access may only be granted after a further provisioning exchange with the subscription manager. Thus, the security may be handled by the subscription manager rather than the Visited PLMN, admission platform or both. The initial configuration (for the provisioning subscription) may be stored in a different way or location in comparison with the eventual configuration from the subscription manager.

The limited access rights may be restricted in one or more of: data volume; data rate; access time duration; or in other network or Quality of Service (QoS) parameters. This will be discussed further below.

In embodiments, the subscriber may be configured with no key. For example, the subscriber, subscription unit or a device associated therewith may use a deterministic way of generating responses to authentication challenges, common to the device and the admission platform. Nevertheless, a key may mean that it is not trivial for a visited network to be abused by having a significant number of fake connections. This may be a much less serious concern than the normal fraud issues that may result if more fully featured network access is granted to poorly authenticated devices, in view of the restricted access provided by the admission platform.

The key may be stored at the subscription unit in a variety of ways. It could be stored in a UICC or SIM-type subscription unit, it could be stored in a separate piece of secure hardware within the device, it could be stored in software or it could be stored in a secure execution environment (a secure mode of operation of the hardware within the device). Moreover, where the initial key (for the provisioning subscription used at first) is stored need not be the same as where the eventual key (for a longer term, more fully capable subscription) ends up being stored.

Thus, initial access security can be reduced and possibly minimised. In this aspect, there may be provided a network subscription unit or apparatus (such as a UICC or SIM card), comprising: a subscription identifier; and optionally a cryptographic key. The cryptographic key may be based on the subscription identifier, an identifier for a device associated with the network subscription apparatus or a combination (such as by a cryptographic hash) of both.

The subscription identifier may comprise at least a portion to identify the subscriber as special to the network. As discussed above, the subscriber identity (or at least the MSIN part of a temporary IMSI) may be generated randomly at the subscription unit or a device associated with the subscription unit. This functionality may be provided so that the subscriber identity contains enough information for the visited network to route the request to the correct home network and enough information for the home network to identify the subscriber as special (such as new).

The initialisation request is typically a request within the normal procedures for the subscriber to attach to the visited PLMN. In the preferred embodiment, the initialisation request comprises a request for security vectors in relation to the subscriber. The method may further comprise generating a security vector at the admission platform. The security vector (based on a key) need not necessarily be very secure. In particular, the security vector may be based on the subscriber identity (such as the IMSI), IMEI or both. In fact, the security vector may be generated without a key.

Preferably, the method further comprises communicating a challenge message to the subscriber from the network (particularly the visited PLMN and more preferably an MME). In this case, the challenge message may be based on the generated security vector, which may be received from the admission platform. The method may further comprise generating an authentication response at the subscriber, the authentication response being based on the temporary IMSI, IMEI or both. The method for generating the security vectors at the admission platform and the method for generating the authentication response at the subscriber may be commonly known to both the admission platform and the subscriber.

The method may further comprise communicating an authentication response between the subscriber and the visited PLMN (especially an MME). This challenge and authentication response may have a number of advantages: it may allow the subscriber to check that the network is valid; and it may allow the network to check that the subscriber is valid. This assurance may be low. Nonetheless, the Visited PLMN does not need to know that the security is low (the procedure may be entirely conventional from the perspective of the Visited PLMN, although it may look very different to the Home PLMN, subscriber or both) and moreover, the provisioning subscription is so restricted in how it can be used, such that the effect of providing access on the Visited PLMN is minimal if at all.

Preferably, the method further comprises: communicating a location update message (such as an Update Location Request) from the Visited PLMN (especially, an MME) to the admission platform in respect of the subscriber. This typically occurs after the challenge and response process described above. The location update message advantageously provides the IMEI for the device associated with the subscriber. This may be a full IMEI Software Version (IMEISV).

Optionally, the step of assigning the subscriber limited access rights comprises: communicating a location update acknowledgement message (an Update Location ACK) from the admission platform to the Visited PLMN (particularly, an MME). The location update acknowledgement message typically comprises a second identifier for the subscriber, particularly a Mobile Subscriber Integrated Services Digital Network (MSISDN) Number. Additionally or alternatively, the location update acknowledgement message may comprise at least one charging characteristic for the subscriber.

The location update acknowledgement message beneficially comprises an instruction to the Visited PLMN to provide the subscriber with limited access rights. This may be achieved in a number of different ways, for instance dependent on whether the access network and subscriber can set up a Packet Switched (PS) connection or a Circuit Switched (CS) connection. In some embodiments, the instruction comprises an indication of at least one Access Point Name (APN) and preferably only one APN. Then, the instruction may further comprise an instruction that the subscriber cannot obtain access other than through the indicated at least one APN. By specifying an APN for the subscriber to use in a PS connection, the subscriber may be restricted in communications. For example, the APN may provide access only to the subscription manager, such as using a Virtual Private Network (VPN). In other embodiments, the instruction restricts the subscriber to use of Unstructured Supplementary Service Data, USSD, only. The use of USSD is generally restricted to between the subscriber and the Home PLMN, in which the admission platform is beneficially located. The admission platform (or another network element in the Home PLMN) may then be configured to route such messages to the subscription manager. Thus, restricting the subscriber to the use of USSD only may limit user-plane communications from and to the subscriber may restrict these to the subscription manager only.

In the preferred embodiment, the method further comprises communicating a create session request message from an MME to a Serving Gateway (S-GW) of the Visited PLMN. The method may then further comprise: communicating a create session request message from Serving Gateway (S-GW) to the Packet Data Network (PDN) Gateway (GW), in response to the create session request message from the MME. Then, the method may further comprise: communicating a create session response message from the PDN GW to the S-GW in response to the create session request message. Then, the method may further comprise: communicating a create session response message from the S-GW to the MME, in response to the create session response message from the PDN GW.

The method beneficially further comprises: communicating a session message (such as a RADIUS Accounting Request) from the edge of the access network (particularly a PDN GW in the Home PLMN, for example) to the admission platform. The session message may comprise an indication of an IMEI (particularly the IMEISV) for a device associated with the subscriber. The session message may further comprise one or more of: a second identifier for the subscriber (such as an MSISDN); the subscriber identity; and one or more charging characteristics.

The method may further comprise: communicating an attach accept message (which may include an initial context setup request message) from an MME to a base station (such as a NodeB or eNodeB), especially in response to the create session response message from the S-GW. The method may further comprise: communicating an attach accept message from the base station to the subscriber, especially in response to the attach accept message from the MME. The method may further comprise: communicating an attach complete message from the subscriber to the base station, especially in response to the attach accept message from the base station.

Particularly once the step of provisioning the subscriber is complete, the method may move to a final phase. For example, the method may further comprise: communicating a cancellation message (for example, a Cancel Location) from the admission platform to the Visited PLMN subsequent to reconfiguration of the subscriber identity, especially so that the Visited PLMN will detach the subscriber. The subscription manager may communicate a message to the admission platform, the message comprising an indication to communicate the cancellation message, subsequent to provisioning the subscriber. This may cause an immediate detach of the subscriber. The method may further comprise instructing the device associated with the subscriber to restart. The method may comprise restarting the device associated with the subscriber.

Additionally or alternatively, the attachment of the subscriber to the Visited PLMN may have very short lifetime, low data volume restriction or both. For example, the visited PLMN may automatically detach the subscriber after a short period (possibly a small number of minutes, such as 1, 2, 3, 5, 8 or 10 minutes), even if there is no explicit cancellation message. Similarly, the data volume restriction (which can be defined in terms of uplink data, downlink data or a combination of the two) may not be significantly more than is sufficient to permit provisioning via the subscription manager. The visited PLMN may automatically detach the subscriber once the data volume restriction has been used, even without an explicit cancellation message. Additionally or alternatively, the device or subscriber may automatically detach after the short time or after all the data volume restriction has been used, even if there is no cancellation message. Various degrees of cancellation may be possible. For example, if the device (or another device using the same temporary IMSI) attempts to attach again, the visited PLMN may let it try again or it may automatically reject that IMSI (for example, as black-listed).

In a different aspect, there is provided a method for managing subscriber authentication in a network, comprising: communicating authentication information for a subscriber from a subscription manager to an admission platform that restricts access to the network, the subscriber and subscription manager sharing the authentication information for the purpose of authenticating the subscriber to the subscription manager. Advantageously, the step of communicating thereby allows the admission platform to generate security data based on the communicated authentication information for authenticating the subscriber to access the network. This approach may be implemented at the subscription manager, admission platform or a combination of the two. This approach may be implemented in combination with any features discussed above, possibly in combination with the method of another aspect, but not necessarily so.

The authentication information may be a cryptographic key or data derived from the cryptographic key. The subscriber may be linked to a subscription unit (such as a SIM, UICC, SIM application, subscription application, device with an integrated subscription or subscription application (software, for example) or similar, as discussed above. Preferably, the security data is a security vector. In the preferred embodiment, the network is a cellular network, such as a PLMN. In this case, the admission platform may be a HLR/HSS (as noted above) or another network entity in the Home PLMN, as noted above. The subscriber may then be seeking authenticated access to a Visited PLMN.

Optionally, the method further comprises generating the security data at the admission platform based on the communicated authentication information for authenticating the subscriber to access the network. The method may further comprise communicating the generated security data from the admission platform to an access part of the network (such as a visited PLMN) for authentication of the subscriber.

The authentication information may be based on or comprise one of: a group key; a device specific key; and a combination of a group key and device specific key. The group key may be provided by a silicon vendor. The group key may be in a ROM mask. The device key may be provided by a device manufacturer.

In a further aspect, there is provided a computer program, configured to carry out any method as described herein, when operated by a processor. In particular, the methods described above may be implemented as a computer program comprising program instructions to operate a computer. The computer program may be stored on a computer-readable medium.

In another aspect, there is provided an admission platform for provisioning a subscriber in a network. Typically, the subscriber and admission platform are associated with a common network operator. The admission platform comprises: a network interface, configured to receive an initialisation request for access to a network on behalf of a subscriber (linked to a subscription unit). The initialisation request may indicate a subscriber identity previously assigned to the subscriber. The network interface is further configured to assign the subscriber limited access rights to the network, the limited access rights being configured for communication between the subscriber and the subscription manager, for reconfiguration of the subscriber identity. The admission platform may further comprise a processor configured to identify the subscriber as special (such as new), on the basis of the indicated subscriber identity. The network interface may be configured to assign the subscriber limited access rights based on the identification by the processor.

A yet other aspect of the invention may provide an entity (such as an admission platform or subscription manager) for controlling or managing authentication of a subscriber in a network. The entity may be configured or comprise an interface that is configured to communicate authentication information for a subscriber between the subscription manager and admission platform that restricts access to the network. The subscriber and subscription manager are configured to share the authentication information for the purpose of authenticating the subscriber to the subscription manager. Advantageously, the communication thereby allows the admission platform to generate security data based on the communicated authentication information for authenticating the subscriber to access the network. This may have optional features corresponding with the method for managing subscriber authentication in a network discussed herein.

The admission platform may form at least part of a network entity in a cellular network, especially in a Home PLMN part of the cellular network. A network entity comprising such an admission platform may be further provided.

In a yet further aspect, there may be provided a provisioning system comprising: the admission platform as described herein; and the subscription server as described herein. Optionally, the provisioning system may further comprise a routing system, configured to route messages from a subscriber to the subscription server. The routing system may be part of the same network as the admission platform.

The admission platform, subscription manager, network entity, provisioning system or any combination thereof may further comprise optional apparatus or structural features configured to implement any of the method steps as described herein.

The network entity may comprise a computer system. The computer system may include a processor such as a central processing unit (CPU). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX (including Linux), Windows (RTM), for example.

It should be noted that any feature described above may be used with any particular aspect or embodiment of the invention. Moreover, the combination of any specific apparatus, structural or method features is also provided, even if that combination is not explicitly disclosed.

BRIEF DESCRIPTION OF THE FIGURES

The present invention may be put into practice in a number of ways and an embodiment will now be described by way of example only and with reference to the accompanying drawings, in which.

It should be noted that the figures are illustrated for simplicity and are not necessarily drawn to scale. Like features are provided with the same reference numerals.

DETAILED DESCRIPTION OF THE PREFERRED EMBODIMENTS

Figure 1:
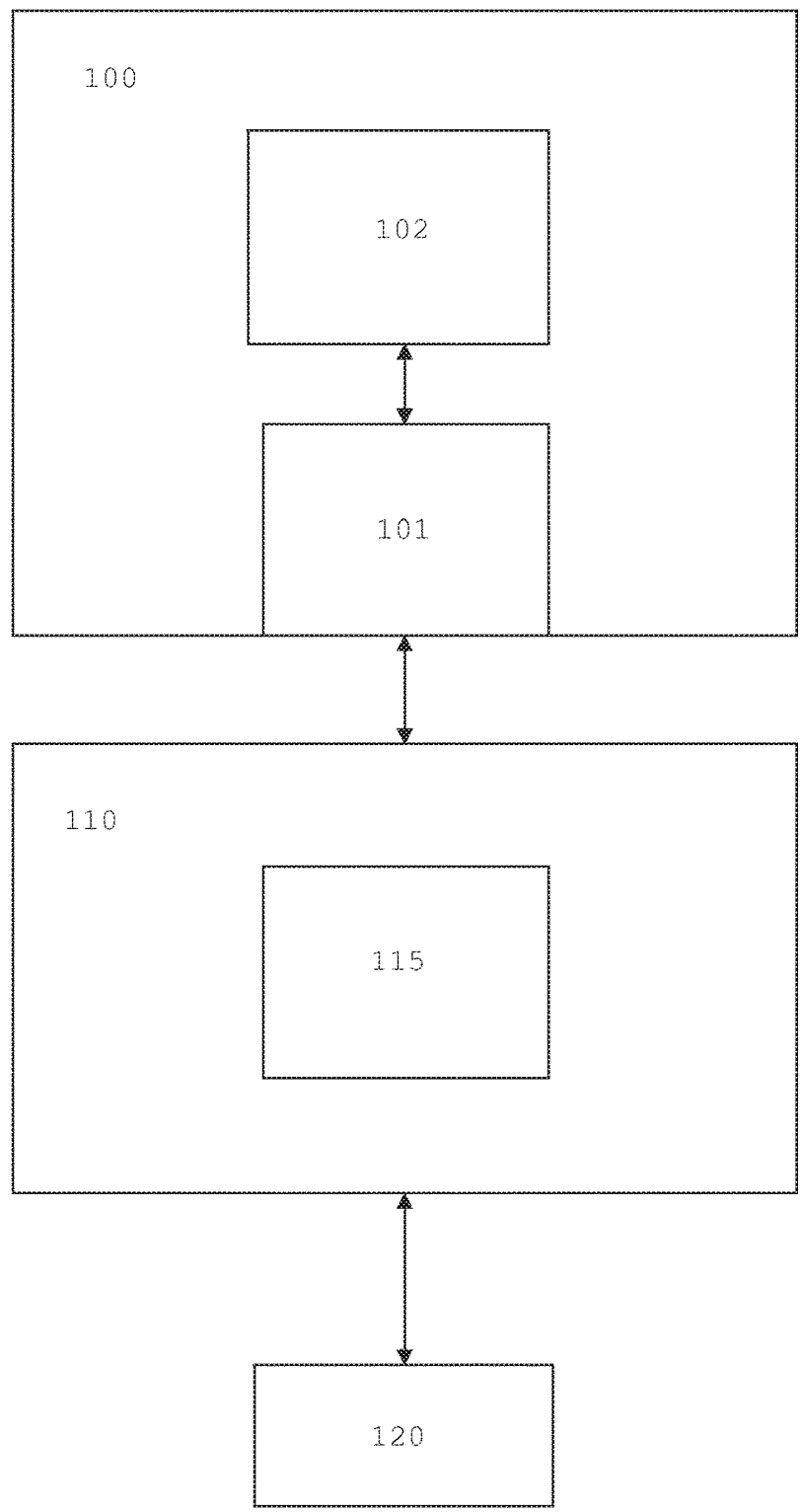
FIG. 1 shows a schematic diagram of a network configuration including an admission platform in accordance with the disclosure, given by way of example only.

Referring first to FIG. 1, there is shown a schematic diagram of a network configuration including an admission platform in accordance with the disclosure, given by way of example only. The network configuration comprises: an admission platform 100; an access network 110; and a subscriber 120. The schematic diagram of FIG. 1 relates to a cellular network, but it can equally be applied to another type of communications network, especially a radio access network (such as a wireless LAN or WAN), but potentially also a wired network.

The admission platform 100 comprises: a network interface 101; and a processor 102. These are shown as separate logical units, but they may be combined or their functionality may be distributed in other ways. The access network 110 comprises a mobility management entity (MME) 115 (which controls mobility management in an LTE configuration), but an equivalent network entity could be used as an alternative. In a cellular network, the subscriber 120 has a subscription unit, which likely comprises a UICC or SIM card (not shown) coupled to (or integrated with) a device (also not shown), although a single integrated arrangement is also possible. In principle, the subscription unit can simply be a software application, running on an associated device. The subscriber 120 has an initial configuration, which is generally recorded on the UICC or SIM card. This initial configuration is associated with a network operator and the admission platform 100 is located in a central part (logically, not necessarily physically or geographically) of the network managed by the network operator. In a cellular network, this is typically referred to as a Home PLMN and the admission platform 100 may be part of or interfaced with a Home Location Register (HLR)/Home Subscriber Server (HSS) of a Home PLMN part of a cellular network. In fact, the Home PLMN may comprise multiple HLR/HSS entities, each of which may handle a defined subset of the subscribers associated with that PLMN. In this embodiment, the admission platform includes the HLR/HSS and functionality in the Home PLMN to route subscribers to that HLR/HSS, but the admission platform may also be a specific HLR/HSS without that Home PLMN functionality. The access network 110 may be managed by the same network operator or (more likely) another network operator and is referred to in a cellular network as a Visited PLMN.

The network interface 101 receives an initialisation request (as part of an Attach procedure, for example, in a cellular network) for access to a network on behalf of the subscriber 120. The initialisation request indicates a temporary subscriber identity (such as a temporary IMSI) that may be previously assigned to the new subscriber in their initial configuration. The processor 102 identifies the subscriber as new, on the basis of the indicated temporary subscriber identity. This will be discussed below with reference to a cellular network. Then, the network interface 101 assigns the new subscriber limited access rights to the network, generally by communicating with the MME 115. These limited access rights are for user-plane communication between the new subscriber and a subscription manager (not shown) only, for reconfiguration of the subscriber identity.

As discussed above, a "minimal" provisioning subscription, with very little security, but just enough to allow an initial connection via a cellular network to the subscription manager can therefore be used. The access provided to the subscriber by the admission platform 100 to the subscription manager may be a channel with very low data requirements and a very short lifetime. This may be sufficient to allow a protocol to be run between the subscription manager and the subscriber 120 to allow provisioning. The channel could use packet-switched data or circuit-switched data.

The subscription manager is a server that is typically operated by the Home PLMN operator, although it may be operated by a third party or by multiple PLMN operators. Access to the subscription manager may be via a packet-switched link, such as via internal nodes of the Visited PLMN and Home PLMN or via the Internet. A circuit-switched link may be used and communication may be provided by USSD.

The subscriber 102 has a "fake" IMSI. This may be based on: a designated Country Code (CC) and Network Code (NC) (identifying the network operator thereby); a sub-range of the IMSI-range designating "fake" IMSIs; and a running part of the IMSI that is based on the device identifier, for example IMEI or MAC address.

On attachment to a cellular network, the visited network requests an authentication vector (triplet or quintuplet) from the subscriber's home network (defined by the CC/NC indicated in the IMSI).

On receiving this request, the relevant Home network notices the sub-range in the IMSI and instead of routing the request to the full HLR, it uses a "special" or "dummy" HLR (which may be part of the HLR tasked to deal with such IMSI ranges or a separate entity, run in parallel with the HLR) to create a minimal authentication vector. This has no real secure key (such as the Ki normally required), just something in the place of the Ki to meet the formal requirements for 3GPP Authentication and Key Agreement (AKA). For example, the key could be a hash of one or both of: the fake IMSI; and the IMEI. Alternatively, a fixed key may be used or a hash of one or more of: the fixed key; IMSI; and IMEI. This "special" or "dummy" HLR functionality is a key part of the admission platform 100 herein.

The channel set up by the access network will depend on whether packet-switched data or circuit-switched data is to be used. For packet switched data, the following procedure may be followed. When a Packet Data Protocol (PDP) context is set up, the Gateway GPRS Support Node (GGSN) assigns an Access Point Name (APN) which allows connections only to a Secure Subscription Manager server. There is also a limit on data volume and connection time (typically, just enough to download an operator profile and credential).

For circuit-switched data, the channel is configured as follows. Voice and SMS are prohibited. Only Unstructured Supplementary Service Data (USSD) is supported. The HLR (typically admission platform 100) receives the USSD and routes it to the Secure Subscription Manager server, which may be part of the admission platform in some embodiments, but is separate in the specific embodiment discussed herein. USSD return data is sufficient to download a proper profile and operator credential.

After downloading the profile, there is a suitable rejection on closing the "fake IMSI" session. This terminates attachment of the subscriber 120 to the access network 110 and allows the subscriber 120 to complete the reconfiguration process.

Another advantage can be noted here. The initial channel (or "pipe") allows the device to download a simple profile (which may simply be an IMSI, cryptographic key K and an algorithm selection parameter). Then, the device establishes a new connection secured based on the simple profile just downloaded. The device uses this to get an improved subscription (which may have a higher data volume, which may be termed a "fatter pipe") and download a bigger profile, potentially with Remote Applet Management (RAM), Remote File Management (RFM), other SIM Toolkit applets or similar.

Figure 2:
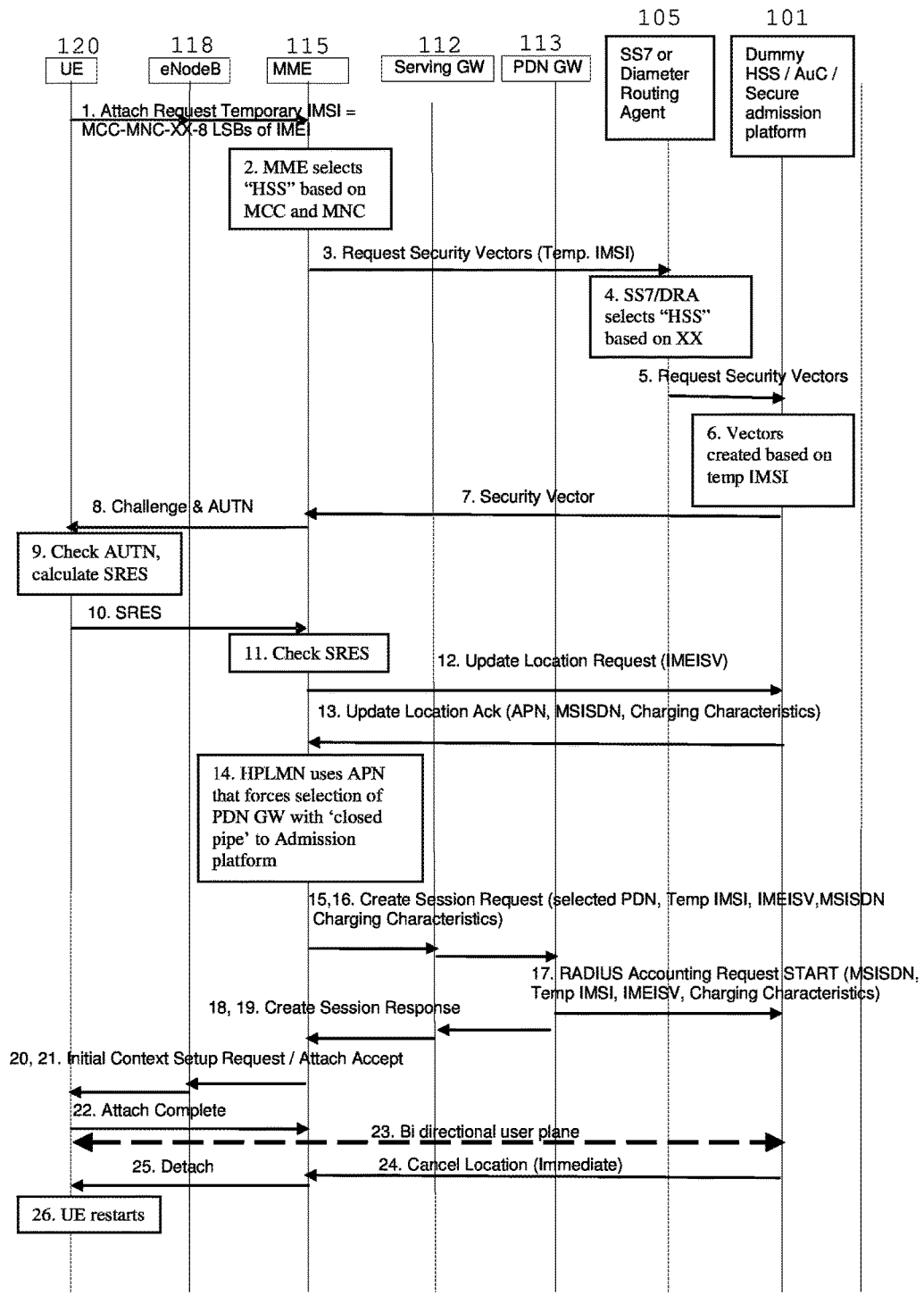
FIG. 2 depicts a schematic illustration of example messages for configuring a new subscriber in line with an embodiment of the disclosure.

Referring now to FIG. 2, there is shown a schematic illustration of example messages for configuring a new subscriber. This is based on the Attach procedure shown in section 5.3.2 of 3GPP TS 23.401 v.12.4.0. Where the entities shown in FIG. 1 are used in this drawing, the same reference numerals have been employed. Also shown are: provisioning system 101; the base station (eNodeB) 118; the Serving Gateway (S-GW) 112; the PDN Gateway (PDN GW) 113; and the Signalling System 7 (SS7) or Diameter Routing Agent 105. This illustration is particularly configured for packet-switched data, but the differences for a circuit-switched approach will be discussed subsequently. The provisioning system 101 may comprise: the admission platform 100; and the subscription server. These two entities or functionalities are logically separate but they may both be part of the same server or physically separate within the Home PLMN or even physically separate with different operators. The provisioning system 101 may also include further elements, such as routing systems (for example, within the Home PLMN).

In Step 1, the device (UE 120) is configured with a "HPLMN code" (MNC and MCC) and a few routing bits denoted XX. The device 120 also has a hardware serial number, such as an IMEI. From these, the device constructs an IMSI to put into the (power on) Attach message.

Next, the normal 3GPP procedures are carried out in step 2 with the MME selecting the HSS based on the MCC and MNC. For 4G and 3G PS connections, this may be a DNS enquiry that uses the XX bits to return the 'special' HSS (admission platform 100) address. In step 3, the MME 105 sends a Request Security Vectors message, which is routed through the SS7 Agent 105. The message identifies the Temporary IMSI. In 2G or 3G networks (but not normally 4G networks) for PS or CS data, the Visited PLMN may support Automatic Device Detection, in which case the full IMEISV is obtained and inserted into this message as well.

In the Home PLMN, an SS7 box 105 (CS or legacy PS) or Diameter Routing Agent uses the XX bits in the temporary IMSI to route to a "special" HLR/HSS in the provisioning system 101 (in this case, the admission platform 100 also acts as an HLR/HSS) in step 5. The Temporary IMSI is used (step 6) to generate one or more security vectors. Provided that this whole procedure is completed quickly, the risk of two UEs presenting the same Temporary IMSI is (extremely) low. For 2G or 3G networks, the full IMEISV may be present and this could then be used to generate the vector. This will be discussed below. The security vector is then communicated to the MME 115 in step 7.

Steps 8, 9 and 10 relate to the conventional challenge and response security check that is a normal part of the 3GPP-specified attach procedures. Where the security vector is based on IMEISV, it may then be necessary to ensure that the UE 120 knows whether or not a challenge is based on the full or short IMEISV. Additional bits in the "challenge" message can be used to signal this (for example, by copying how a USIM knows whether the vector is a 3G or a 4G vector). In step 9, some known algorithm (such as a '1X' style Hash algorithm) is used by the device to: check that the core network is not fake; and to provide some security. This check is only provided with a low security level, but it need not be especially important. A fake visited network cannot normally achieve a significant amount. In particular it does not normally permit a deceptive subscription manager. The response of the UE 120 is sent in step 10 and this is checked by the MME in step 11.

The cryptographic key at the subscriber may comprise a group key (such as a key in a ROM mask), which may be used to generate the response to the security vector-based challenge, or the use of a combination of group key and device unique key to generate the security vector-based challenge response. A group key is typically a key that may be shared by multiple devices, for example by a batch of devices produced in a single factory run. A combination where the subscription manager derives a temporary key (from the group key, or from the device-unique key, or both) and provides this to the admission platform may also be possible. Then the admission platform may use this temporary key to generate the security vector, before discarding it. In this way, the admission platform 100 does not need to have access to any of the group and/or device unique secrets held by the subscription manager.

Subsequently, the MME 115 sends an Update Location Request (step 12) to the HSS/admission platform 100, including the IMEISV. The HSS sends the Update Location Ack message, sending the APN and restricting the device 120 from using any other APN, in step 13. This restriction is implemented at the MME 115 in step 14. Steps 15, 16, 17, 18 and 19 deal with the normal initialisation procedure. The GGSN or PDN GW (113) may support more than one APN, but the APN indicated by the admission platform 100 identifies a Virtual Private Network (VPN, also termed a "closed pipe") to an entity which is a subscription manager, which forms part of the provisioning system 101.

Steps 6, 13 and 17 also deal with assignment of the MSISDN and charging characteristics. The VPLMN is required to copy these back to the GGSN or PDN-GW 113 (if they are sent to it by the HSS or admission platform 100) and these can be sent out as RADIUS attributes. In steps 16 and 17, the VPLMN is required to send the IMSI to the GGSN or PDN-GW 113 and typically also sends the full IMEISV. This enables several mechanisms for the admission platform 100 to bind the Attach procedure to the closed data pipe through the PDN-GW 113 (or GGSN—SGW 112—Radio network) to the UE.

Then, steps 20, 21 and 22 complete the attach procedure. This allows bi-directional user-plane communication between the UE 120 and subscription manager, in order to reconfigure the IMSI (and other subscription parameters) of the subscriber 120, as discussed above.

After successfully updating the credentials on the user plane (in step 23, as discussed above), the admission platform 100 (possibly prompted by the subscription manager) sends a Cancel Location to the VPLMN in step 24 (this causes immediate teardown of the resources, for example in the same as for a customer reporting a stolen mobile). This causes the MME 115 to send a Detach message to the subscriber 120 in step 25 and the UE 120 then restarts (step 26). After step 26, the device 120 performs a normal power-on Attach with the newly configured IMSI and security credentials.

In the CS domain, perform steps 1 to 12 are basically performed as detailed above. However in step 13, the admission platform 100 simply bars all Teleservices (calls, data calls, SMS) for the subscriber 120 and just permits USSD. Optionally, only SMS may be permitted. Then, step 23 comprises the device 120 carrying out a Mobile Originated USSD sequence with the subscription manager (according to existing 3GPP standards, USSD strings are sent towards the HSS, although they can be routed away to a different SS7 platform). The USSD exchanges can move chunks of (around 200) bytes of configuration into the device. Once the credentials are loaded, the admission platform 100 sends the Cancel Location message (as in step 24), and the UE 120 detaches (step 25). The UE 120 then restarts, as per step 26 and subsequently performs a power on Attach (Location Update) with the new IMSI.

As will be appreciated by the skilled person, details of the above embodiment may be varied without departing from the scope of the present invention, as defined by the appended claims.

For example, different network configurations may be possible. The definition of the IMSI and other parameters may change and the messages used and their structure may be varied depending on the network architectures and configurations. Although the admission platform 100 discussed above is presented as an HSS/HLR), it may be external to an HSS/HLR, in particular as another part of the Home PLMN. Other configurations are also possible, some of which have been briefly mentioned above.

Whilst the approach described herein has been employed for a new subscriber, it will be understood that the technique could equally be applicable to other types of special subscriber, that may wish to be re-provisioned for a variety of reasons. This can still be achieved without the need for the subscription unit to be changed. Although the temporary IMSI may be previously assigned to the new subscriber in their initial configuration, it may be determined directly by the SIM or UICC or by the device (such as a UE or M2M device) associated with the subscriber or subscription. The running part of the temporary IMSI could be set in ways other than using the device identifier. For example, it may be random, based on a predetermined algorithm or even fixed.

The limit on data volume and connection time is optional in many embodiments. Either or none may be used in practice.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A method for provisioning a subscriber in a network, comprising the steps of:
   receiving an initialisation request for access to a network on behalf of a subscriber linked to a subscription unit, at an admission platform of a network operator associated with the subscriber, the initialisation request indicating a subscriber identity and relating to a Visited Public Land Mobile Network (PLMN), wherein the admission platform is part of a Home PLMN of the subscriber; and
   assigning the subscriber limited access rights to the network in response to the received initialisation request, the limited access rights being configured for communication between the subscriber and at least one subscription manager, for reconfiguration of identity information associated with the subscriber,
   wherein the step of assigning the subscriber limited access rights comprises:
      creating an authentication vector that is generated using a placeholder authentication key in place of a real authentication key, the placeholder authentication key being either a fixed key or deterministically derived from values associated with a device of the subscriber; and
      communicating a location update acknowledgement message from the admission platform to the Visited PLMN subsequent to a location update message from the Visited PLMN, the location update acknowledgement message being transmitted using the placeholder authentication key and comprising an access instruction to the Visited PLMN to provide the subscriber with the limited access rights,
         wherein the access instruction comprises an indication of at least one Access Point Name (APN) and an instruction that the subscriber cannot obtain access other than through the indicated at least one APN, and
         wherein the at least one APN provides access only to the at least one subscription manager through a communication channel between the subscriber and the at least one subscription manager such that the limited access rights are provided by the access to the network being limited to access to the at least one subscription manager.

2. The method of claim 1, wherein the subscriber identity indicates the network operator associated with the subscriber and wherein the admission platform is configured for receiving initialisation requests indicating the network operator associated with the subscriber.

3. The method of claim 1, further comprising:
   provisioning the subscriber, by communication of instructions to reconfigure the subscriber identity from the subscription manager to the subscriber.

4. The method of claim 1, wherein the subscriber identity is an International Mobile Subscriber Identity (IMSI) comprising a Mobile Subscriber Identification Number (MSIN) the MSIN comprising a predetermined code indicating that the IMSI is a subscriber identity.

5. The method of claim 1, further comprising:
   generating a security vector at the admission platform, the security vector being based on the subscriber identity.

6. The method of claim 1, wherein the access instruction restricts the subscriber to use only one or both of: Unstructured Supplementary Service Data (USSD) and Short Messaging Service (SMS).

7. The method of claim 1, wherein the subscriber identity is based on one or more of:
   a random sequence;
   a fixed or predefined sequence;
   an International Mobile Station Equipment Identity (IMEI) for the device, which is associated with the subscriber or subscription unit; and
   a Media Access Control (MAC) address for the device, which is associated with the subscriber or subscription unit.

8. The method of claim 1, further comprising:
   communicating a cancellation message from the admission platform to the Visited PLMN subsequent to reconfiguration of the subscriber identity, so that the Visited PLMN will detach the subscriber.

9. The method of claim 1, wherein the admission platform comprises a Home Subscriber Server (HSS) or Home Location Register (HLR) of the Home PLMN.

10. The method of claim 1, wherein the limited access rights are restricted in one or more of: data volume; data rate; access time duration; and a network or Quality of Service (QoS) parameter.

11. An admission platform for provisioning a subscriber in a network, the subscriber and admission platform being associated with a common network operator, the admission platform comprising:
    a network interface, configured to receive an initialisation request for access to a network on behalf of a subscriber linked to a subscription unit and to assign the subscriber limited access rights to the network, the limited access rights being configured for communication between the subscriber and at least one subscription manager, for reconfiguration of identity information associated with the subscriber;
    wherein the initialisation request indicates a subscriber identity and relates to access to a Visited Public Land Mobile Network (PLMN) wherein the admission platform is a part of a Home PLMN of the subscriber; and
    wherein assigning the subscriber the limited access rights comprises:
       creating an authentication vector that is generated using a placeholder authentication key in place of a real authentication key, the placeholder authentication key being either a fixed key or deterministically derived from values associated with a device of the subscriber; and
       communicating a location update acknowledgement message from the admission platform to the Visited PLMN subsequent to a location update message from the visited PLMN, the location update acknowledgement message being transmitted using the placeholder authentication key and comprising an access instruction to the Visited PLMN to provide the subscriber with limited access rights,
       wherein the access instruction comprises an indication of at least one Access Point Name (APN) and an instruction that the subscriber cannot obtain access other than through the indicated at least one APN, and
       wherein the at least one APN provides access only to the at least one subscription manager through a communication channel between the subscriber and the at least one subscription manager such that the limited access rights are provided by the access to the network being limited to access to the at least one subscription manager.

12. The method of claim 1, wherein the admission platform includes both a home location register (HLR) and a specially configured HLR that operates in parallel with the HLR, and wherein the method further includes:
  after the admission platform receives the initialisation request, the admission platform determines a range of the subscriber identity; and
  based on the determined range, the admission platform routes the initialisation request to the specially configured HLR as opposed to the HLR, wherein only initialisation requests whose determined range is within a preselected range are routed to the specially configured HLR.

* * * * *